(12) United States Patent
Lucas

(10) Patent No.: US 9,592,479 B2
(45) Date of Patent: Mar. 14, 2017

(54) AUTOMATIC FLOW CONTROL IN MIXING FRACTURING GEL

(75) Inventor: Bryan Chapman Lucas, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 874 days.

(21) Appl. No.: 13/472,920

(22) Filed: May 16, 2012

(65) Prior Publication Data

US 2013/0308414 A1 Nov. 21, 2013

(51) Int. Cl.
| B01F 3/00 | (2006.01) |
| B01F 3/12 | (2006.01) |
| F17D 1/00 | (2006.01) |
| B01F 5/16 | (2006.01) |
| E21B 21/06 | (2006.01) |
| E21B 21/10 | (2006.01) |
| F16K 31/126 | (2006.01) |
| F16K 1/12 | (2006.01) |

(52) U.S. Cl.
CPC .............. *B01F 3/1221* (2013.01); *B01F 5/16* (2013.01); *E21B 21/062* (2013.01); *E21B 21/106* (2013.01); *F16K 1/126* (2013.01); *F16K 31/1262* (2013.01); *F16K 31/1266* (2013.01); *F17D 1/00* (2013.01); *Y10T 137/0324* (2015.04)

(58) Field of Classification Search
CPC .... B01F 5/0413; B01F 3/1221; E21B 21/106; E21B 21/062
USPC ............ 366/163.2, 141; 137/2, 8, 12, 87.03, 137/87.04, 455, 505.13, 505.14
See application file for complete search history.

(56) References Cited

U.S. PATENT DOCUMENTS

| 3,207,485 | A | 9/1965 | Warren |
| 4,524,906 | A | 6/1985 | Kenyon et al. |
| 4,538,222 | A | 8/1985 | Crain et al. |
| 5,027,267 | A | 6/1991 | Pitts et al. |
| 5,382,411 | A | 1/1995 | Allen |
| 6,568,842 | B1* | 5/2003 | Murray ........................ 366/137 |
| 6,817,376 | B2 | 11/2004 | Morgan et al. |
| 7,048,432 | B2 | 5/2006 | Phillippi et al. |
| 7,794,135 | B2* | 9/2010 | El Kholy et al. .......... 366/163.2 |
| 7,888,294 | B2 | 2/2011 | Weinstein et al. |
| 7,926,564 | B2 | 4/2011 | Phillippi et al. |
| 2004/0218463 | A1 | 11/2004 | Allen |

(Continued)

FOREIGN PATENT DOCUMENTS

EP 0845291 3/1998

OTHER PUBLICATIONS

PCT International Preliminary Report on Patentability, PCT/US2013/038066, mailed Nov. 27, 2014, 9 pages.

(Continued)

*Primary Examiner* — Tony G Soohoo
*Assistant Examiner* — Anshu Bhatia
(74) *Attorney, Agent, or Firm* — John Wustenberg; Parker Justiss, P.C.

(57) ABSTRACT

A system for mixing fracturing gel includes a dry gel mixing chamber having a bladed impeller carried to rotate in the mixing chamber. The mixing chamber has a dry gel inlet and hydrating fluid inlet. A valve is fluidically coupled to the hydrating fluid inlet to automatically maintain a specified flow condition of hydrating fluid into the mixing chamber over multiple different values of the flow condition to the hydrating fluid inlet.

11 Claims, 5 Drawing Sheets

(56) References Cited

U.S. PATENT DOCUMENTS

2008/0165612 A1      7/2008  Dykstra
2008/0167204 A1      7/2008  Slabaugh et al.
2008/0264641 A1     10/2008  Slabaugh et al.
2012/0231982 A1*     9/2012  Weinstein ............... B01F 3/088
                                                         366/76.2

OTHER PUBLICATIONS

Red Valve Company, Inc., "Type a Pinch Valve" http://www.redvalve.com/rv/index.php/content/view/24/87/, Jan. 18, 2012 (2 pages).
Dorot Control Valves, "Dorot Multimedia" http://media.dorot.com/1.php?page=S-300&cat=control, Copyright 2009, May 16, 2012 (1 page).
International Search Report and Written Opinion in International Application No. PCT/US2013/038066, dated Aug. 12, 2013, 12 pages.
European Extended Search Report, European Application No. 13791685.4, Oct. 12, 2015, 6 pages.
Canadian Intellectual Property Office, Requisition by the Examiner, Canadian Publication No. 2,871,214, Oct. 26, 2015, 2 pages.

* cited by examiner

AUTOMATIC FLOW CONTROL IN MIXING FRACTURING GEL

BACKGROUND

Gels for well fracturing operations have traditionally been produced using a process wherein a dry gel particulate and a liquid, such as water, are combined. The manner in which the dry gel particulate and liquid is mixed is important to obtaining consistently hydrated gel.

SUMMARY

Some aspects encompass a system for mixing fracturing gel where the system has a dry gel mixing chamber with a bladed impeller that is carried to rotate in the mixing chamber. The mixing chamber has a dry gel inlet, a hydrating fluid inlet, and a valve fluidically coupled to the hydrating fluid inlet. The valve automatically maintains a specified flow condition, such as pressure or flow rate, of hydrating fluid into the mixing chamber over multiple different values of the flow condition to the hydrating fluid inlet.

Some aspects encompass a method in which a dry gel is received into a dry gel mixing chamber. A flow of hydrating fluid is received into the dry gel mixing chamber. A specified flow condition of the flow of hydrating fluid into the dry gel mixing chamber is automatically maintained over multiple different supply values of the flow condition.

Some aspects encompass a device for mixing dry fracturing gel with hydrating fluid. The device has a mixer defining an interior mixing chamber. The mixing chamber has a dry gel inlet into the interior mixing chamber, a hydrating fluid inlet into the interior mixing chamber, and an automatic valve coupled to the hydrating fluid inlet. The automatic valve is configured to automatically adjust to maintain a specified flow condition of the hydrating fluid supplied into the interior mixing chamber based on a flow condition of the hydrating fluid being supplied to the valve.

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
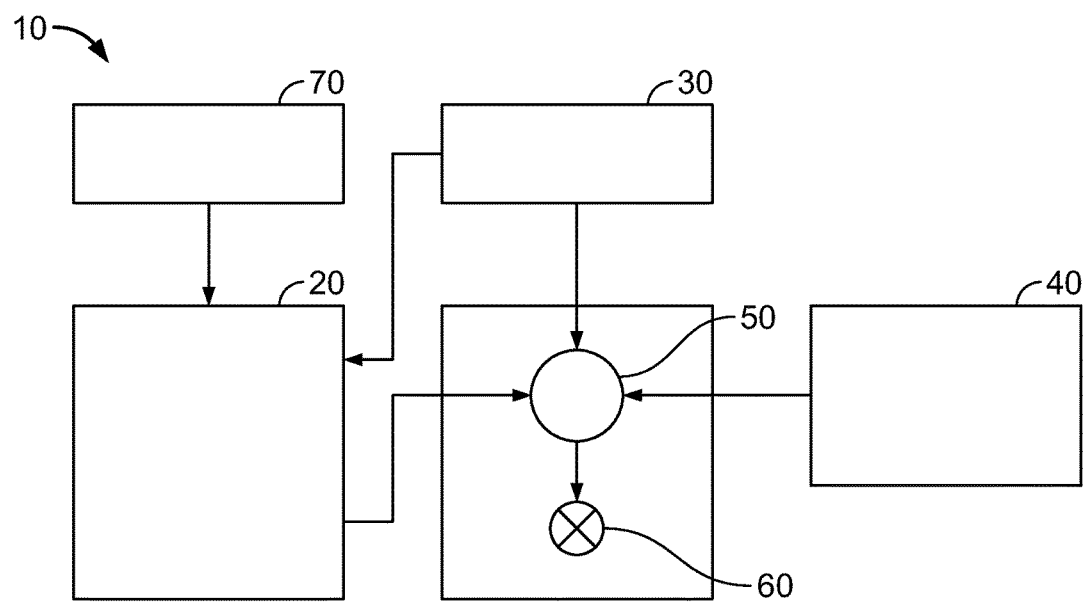
FIG. 1 is a schematic view of an example fracture stimulation system.

FIG. 1 is one example of a fracture stimulation system 10 adapted to hydrate a dry gel particulate and fracture stimulate a subterranean zone using the resulting hydrated gel. The system 10 includes a gel producing apparatus 20, a hydrating fluid source 30, a proppant source 40, and a blender apparatus 50 and resides at a surface well 60 site. The gel producing apparatus 20 combines dry gel particulate with fluid (e.g., liquid or substantially liquid) from fluid source 30, to produce a hydrated gel. In certain implementations, the hydrated gel can be a gel for ready use in a fracture stimulation treatment of the well 60 or a gel concentrate to which additional fluid is added prior to use in a fracture stimulation of the well 60. Although referred to as "hydrated," the hydrating fluid need not be water. For example, the hydrating fluid can include a water solution (containing water and one or more other elements or compounds), a hydrocarbon based fluid and/or another fluid. In some instances, the blender apparatus 50 receives the gel or gel concentrate and combines it with other components, including proppant from the proppant source 40 and/or additional fluid. The resulting mixture may be injected down the well 60 under pressure to fracture stimulate a subterranean zone, for example to enhance production of resources from the zone. The system may also include various other additives 70 to alter the properties of the mixture. For example, the other additives 70 can be included to reduce pumping friction, to reduce or eliminate the mixture's reaction to the geological formation in which the well is formed, to operate as surfactants and/or to serve other functions.

Figure 2:
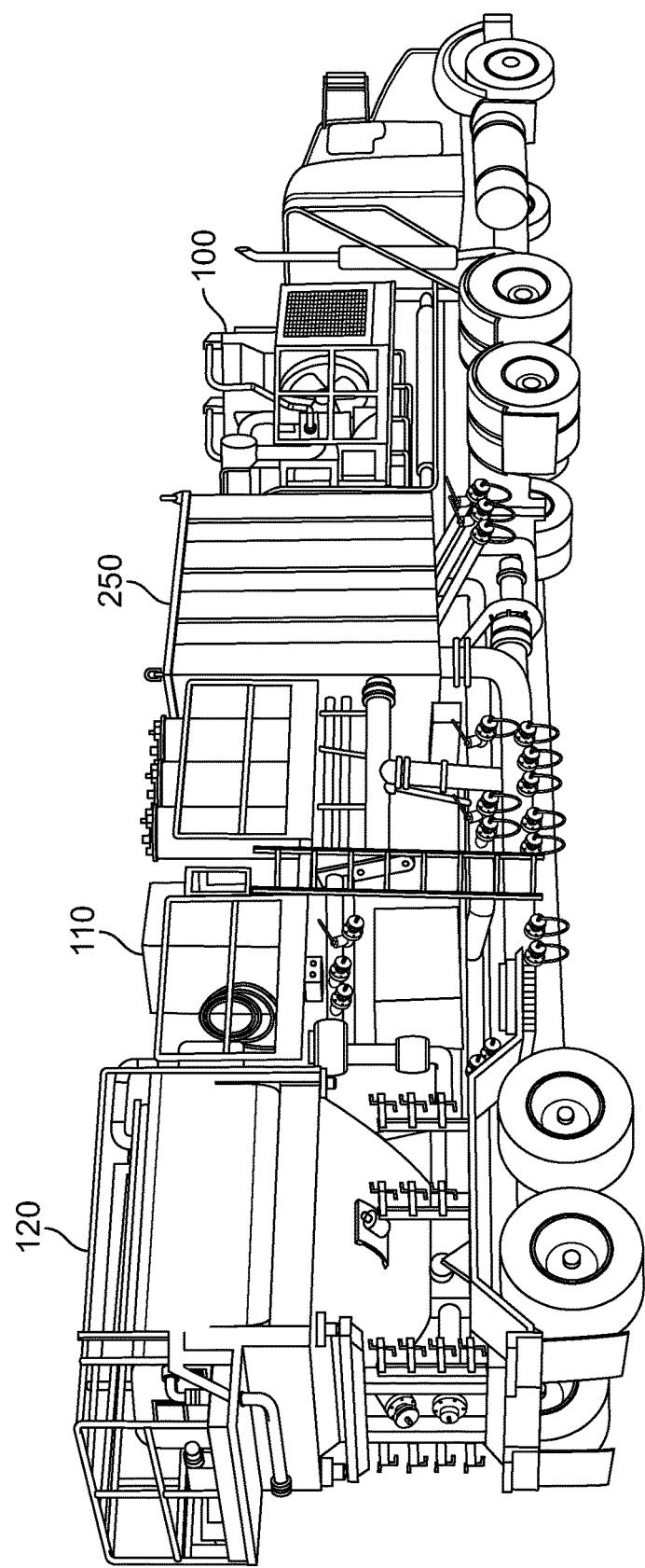
FIG. 2 is a perspective view of an example mobile gel production apparatus capable of producing a fracturing gel from dry gel particulate.

FIG. 2 illustrates an implementation of the apparatus 20 for producing fracturing gel. As shown, the apparatus 20 is portable, such as by being included on or constructed as a trailer transportable by a truck. The apparatus 20 may include a bulk material tank 120, a gel mixing system 250, a power source 100 and a control station 110. Other features may also be included.

In certain instances, the power source 100 is an internal combustion engine that provides, entirely or in part, power for the operation of the apparatus 20. The control station 110 includes a control panel and/or a computer that provides for control of the various functions performed by the apparatus 20 and may be operable by a person, configured for automated control, or both. The control station 110 may, for example, control an amount of dry gel and hydrating fluid combined in a gel mixer (discussed below), the rate at which the gel mixer operates, an amount of gel maintained in a hydration tank (discussed below), and a gel output rate. Further, the control station 110 may be operable to monitor or control other aspects of the apparatus 20. The apparatus 20 may also include various pumps, such as liquid additive pumps, suction pumps, and pumps; mixers; control valves; flow meters; conveying devices, such as conveying augers, vibrators, pneumatic conveying devices; and inventory and calibration load cells.

The dry gel can be a bulk powder material including, for example, hydratable polymers such as cellulose, karaya, xanthan, tragacanth, gum ghatti, carrageenin, psyllium, gum acacia, carboxyalkylguar, carboxyalkylhydroxyalkylguar, carboxyalkylcellulose, carboxyalkylhydroxyalkylcelluose, polyacrylate, polymethacrylate, acrylamide-acrylate copolymers, maleic anhydride methylvinyl ether copolymers and/or other materials and/or other dry gel.

Figure 3:
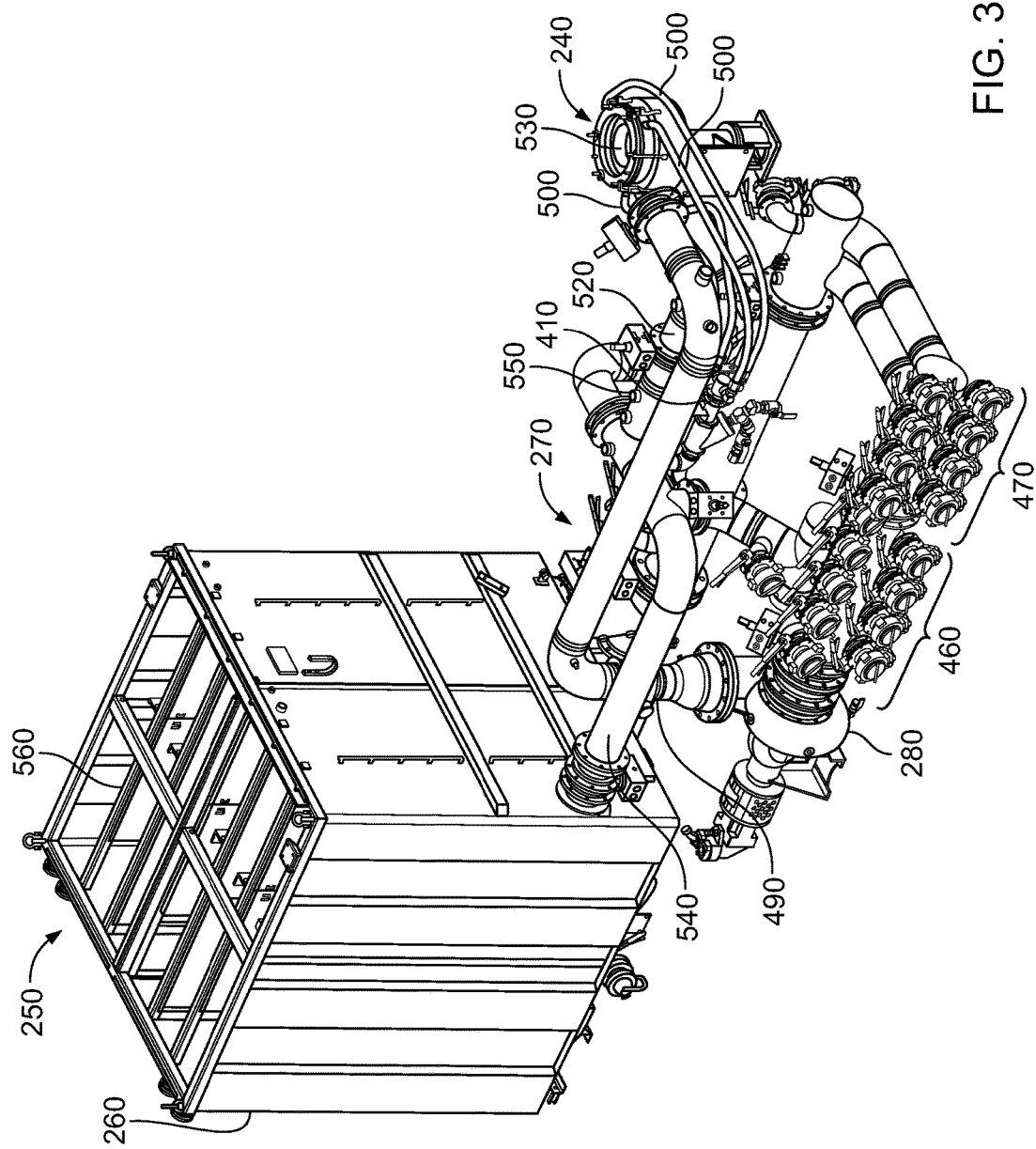
FIG. 3 is a perspective view of an example dry gel mixing system for mixing dry gel particulate and hydrating fluid.

FIG. 3 illustrates a gel mixing system ("mixing system") 250 of the apparatus 20 according to one implementation. The mixing system 250 includes a hydration tank 260, a piping system 270, a suction pump 280, and the gel mixer 240.

A hydrating fluid is introduced into the mixing system 250 via one or more hydrating fluid inlets 460. The hydrating fluid may be provided from the hydrating fluid source 30 (shown in FIG. 1). The hydrating fluid is pumped via the suction pump 280 to the gel mixer 240. The hydrating flows through a flow meter 490. An automatic valve 410 operates automatically to adjust a flow area of, and consequently a flow condition of, the hydrating fluid into the gel mixer 240 at hydrating fluid inlets 500 of the gel mixer 240. In certain instances the flow condition can be pressure, flow rate and/or another flow condition Without the automatic valve 410 or with a valve that is not automatically adjustable, as the flow condition from the suction pump 280 varies, so would the flow condition through the hydrating fluid inlets 500. However, as discussed in more detail below, the valve 410 can operate automatically to maintain a specified flow condition, such as a specified pressure and/or a specified flow rate, of hydrating fluid into an interior mixing chamber of the gel mixer 240 as the flow condition of the hydrating fluid supplied from the suction pump 280 varies over multiple different values. In certain instances, the valve 410 adjusts the flow area therethrough based on one or more of the flow condition of hydrating fluid supplied to the valve 410 (i.e., upstream), the flow condition of the fluid output from the valve 410 (i.e., downstream), and the specified flow condition.

Figure 4:
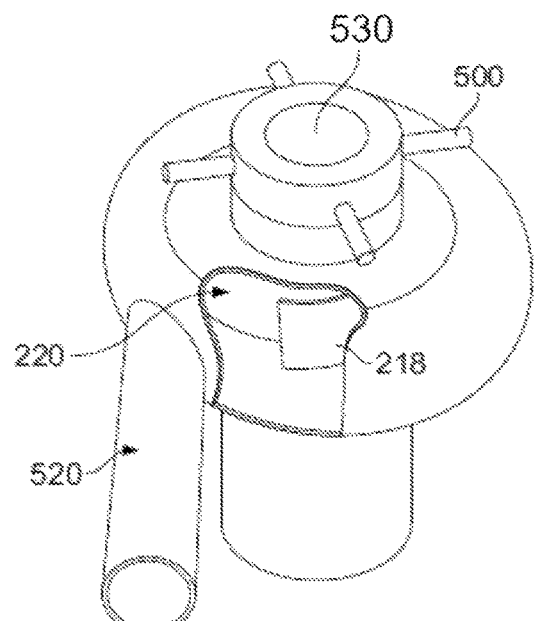
FIG. 4 is a perspective cut-away view of an example dry gel mixer for use in the mixing system of FIG. 3.

Dry gel exiting the bulk material tank 120 enters the gel mixer 240 at dry gel inlet 530. The gel mixer 240 agitates and blends the dry gel and hydrating fluid to form a gel. FIG. 4 shows an example gel mixer 290 that can be used herein. The mixer 240 includes a housing defining an interior mixing chamber 220. A bladed impeller 218 is carried within the interior mixing chamber 220 and powered to rotate. Dry gel is fed into the interior mixing chamber 220 via the dry gel inlet 530. Hydrating fluid is supplied into the interior mixing chamber 220 from the hydrating fluid inlets 500. An example of a gel mixer that can be used as gel mixer 240 is described in U.S. Pat. No. 7,048,432.

Referring back to FIG. 3, the mixed gel exits at 520 and is then directed to inlet 540 of the hydrating tank 260. Along the way, additives may be added through additive ports 550. Various additives may be introduced to change the chemical or physical properties of the gel as required, for example, by the geology of the well formation and reservoir. Once the mixed gel has entered the hydration tank 260, the gel passes through a serpentine path formed by a series of weirs 560 contained within the hydration tank 260. Accordingly, the weirs 560 provide for an extended transient period during which the gel travels through the hydration tank 260. The hydration tank 260 allows the mixed gel to hydrate into completed fracturing gel or gel concentrate. A hydration tank that can be used as hydration tank 260 is described in U.S. Pat. No. 6,817,376.

After passing through the hydration tank 260, the gel is released from the tank from outlets 470 to the blender apparatus 50 where the gel is combined with proppant from proppant source 40. The blender apparatus 50 agitates and combines the ingredients to quickly produce a finished gel and particulate mixture that is subsequently injected into the well 60.

Figure 5:
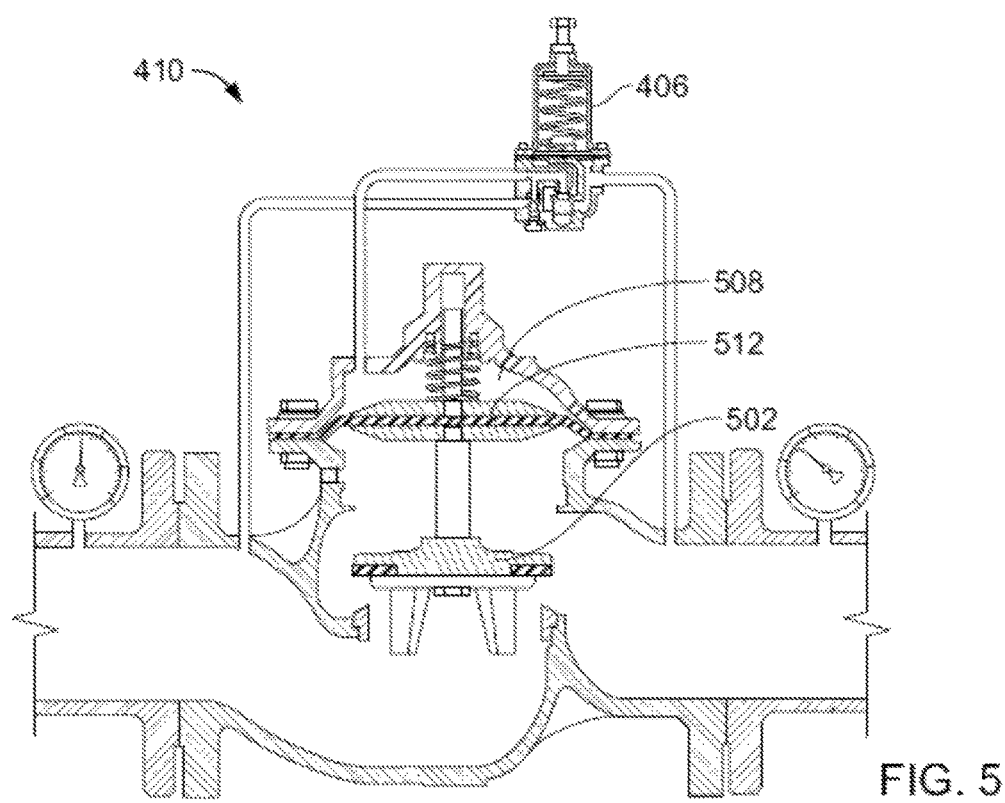
FIG. 5 is a side cross sectional view of an example automatic valve for use in the dry gel mixing system of FIG. 3.

Referring now to FIG. 5, the automatic valve 410 has a valve closure 502 that is moveable to open, close and adjust a flow area 504 through the valve. The valve 410 has a controller 406 that senses the flow condition (e.g., pressure, flow rate and/or other) upstream and/or downstream of the valve closure 502 and is configured to control the valve closure 502 (e.g., adjusting it toward open or toward closed) based on the flow condition upstream and/or downstream of the valve closure 502 to maintain a specified flow condition downstream of the valve closure 502. In certain instances, the specified flow condition can be a pressure selected to yield a specified flow rate in the inlets 500 into the interior mixing chamber 220 of the mixer 240 (FIG. 4).

As shown in FIG. 5, in certain instances, the automatic valve 410 can be a pressure reducing valve that uses a pilot regulator as the controller 406. In the form of a pilot regulator, the controller 406 has a pilot line in communication with a location upstream of the valve closure 502, a pilot line in communication with a location downstream of the valve closure 502, and a plot line to a control volume 508 in the valve 410 that routes pressure into the control volume 508 or vents pressure from the control volume 508. In the configuration of FIG. 5, the control volume 508 is capped at one end by a diaphragm 512, that in turn, is coupled to the valve closure 502. When the pressure in the control volume 508 is increased, it expands the diaphragm 512 and moves the valve closure 502 toward closed. When pressure in the control volume 508 is decreased, it retracts the diaphragm 512 and moves the valve closure 502 toward open. Based on the pressure upstream and downstream of the valve closure 502, and the specified pressure, the controller 406 automatically routes pressure to expand or contract the diaphragm 512, move the valve closure 502 to adjust the flow area through the valve, and control the pressure downstream of the valve closure 502 to maintain a specified pressure. For example, when the pressure upstream of the valve closure 502 increases in a manner that causes the pressure downstream of the valve closure 502 to exceed the specified pressure, the controller 406 routes pressure to the control volume 508 to expand the diaphragm 512, move the valve closure 502 toward closed, and reduce the pressure downstream of the valve closure 502 until the pressure downstream of the valve closure 502 reaches the specified pressure. The amount the valve closure 502 is moved toward closed or open is based on the pressure difference between the specified pressure and the pressure upstream of the valve closure 502. In certain instances, the pilot regulator, pilot lines and control volume can be filled with a fluid that is different from the hydrating fluid. For example, the fluid can be hydrating fluid treated to have a lower freezing temperature or an altogether different fluid with a lower freezing temperature than the hydrating fluid, to make the fluid used in controlling the valve 410 less prone to freezing.

Figure 6:
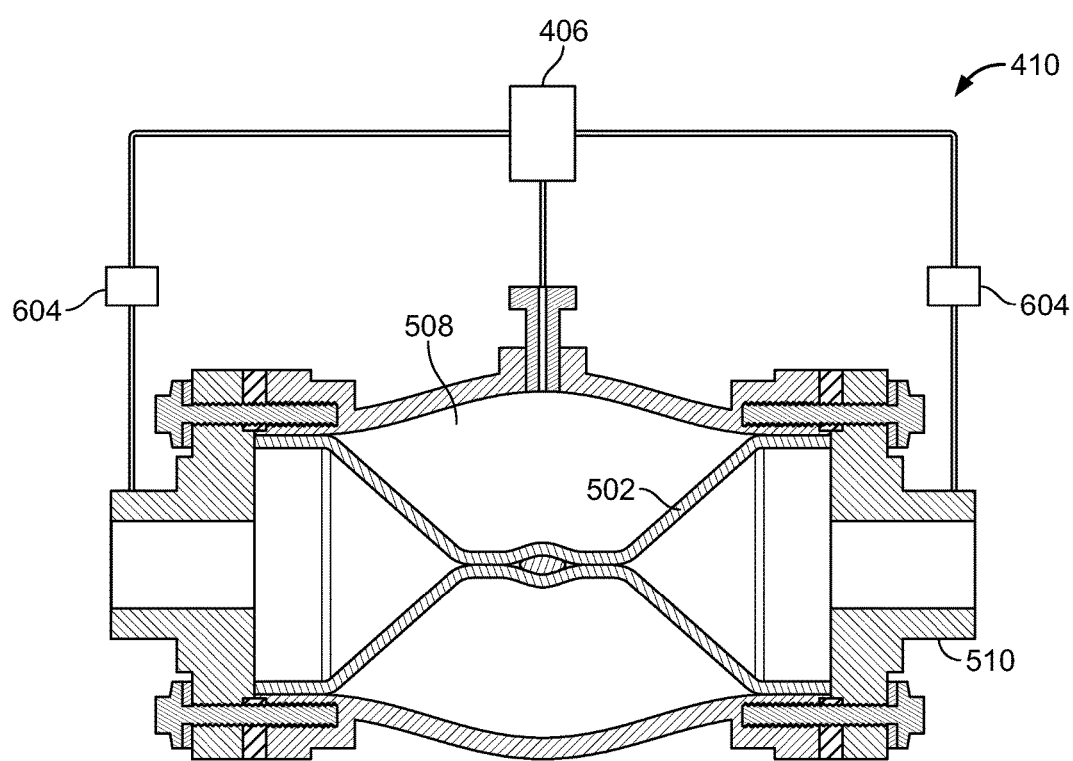
FIG. 6 is a side cross sectional view of another example automatic valve for use in the dry gel mixing system of FIG. 3.

The concepts herein encompass multiple different types of valves and valve closure mechanisms. For example, although shown with a plunger type closure, in certain instances, the valve can have a spherical ball, pintle and seat, butterfly and/or another type of closure. FIG. 4 shows a valve with butterfly type closure. FIG. 6 shows a valve 410 having a flexible sleeve as the valve closure 502. The control volume 508 surrounds the sleeve and when pressurized, constricts the sleeve and reduces the flow area through the valve.

In certain instances, the valve 410 is a Type A pinch valve, such as that manufactured by Red Valve Company, Inc. In certain instances, the valve 410 is an S-300 pressure reducing valve manufactured by Dorot Control Valves. Still other examples exist.

The concepts herein encompass multiple different types of controllers 406, as well. For example, in certain instances, the controller 406 can be an electronic controller 406, with a processor and memory and/or dedicated circuitry, that receives an output from sensors 604 (e.g., pressure, flow rate and/or other sensors) upstream and/or downstream of the valve closure 502 and based on the output from the sensors 604, automatically adjusts the valve closure 502 to maintain the specified flow condition.

By using an automatic valve, the suction pump output pressure can vary from job to job and the flow into the dry gel mixer will remain constant. Thus, an operator is not required to adjust a manual valve nor is the system required to operate with any specific suction pump rate.

A number of implementations have been described. Nevertheless, it will be understood that various modifications may be made. Accordingly, other implementations are within the scope of the following claims.

What is claimed is:

1. A system for mixing fracturing gel, the system comprising:
    a dry gel mixing chamber comprising a bladed impeller carried to rotate in the mixing chamber;
    a dry gel inlet in fluid communication with the mixing chamber, the dry gel inlet directly connected to a tank containing dry, non-hydrated, particulate material, such that, when particulate material is dispensed from the tank, the dispensed particulate material is provided to the dry gel inlet in a non-hydrated state and introduced to the mixing chamber for contact by the bladed impeller;
    a hydrating fluid inlet in fluid communication with the mixing chamber;
    a hydrating fluid source pump fluidly coupled to the hydrating fluid inlet to circulate a hydrating fluid through the dry gel mixing chamber as the bladed impeller rotates, the pump configured to operate at multiple different values of a flow condition to the hydrating fluid inlet;
    a valve fluidly coupled to the hydrating fluid inlet and coupled to a controller that senses a flow condition of the valve and is configured to automatically adjust a flow area through the valve in response to a change in an operating flow condition of the pump so that, as the hydrating fluid source pump operates at the multiple different values of the flow condition to the hydrating fluid inlet, the valve maintains a constant specified flow condition of hydrating fluid into the mixing chamber; and
    a mixed gel outlet oriented outward from the mixing chamber, and leading to a fluid conduit extending to a hydration tank.

2. The system of claim 1, where the specified flow condition is flow rate.

3. The system of claim 1, where the specified flow condition is pressure.

4. The system of claim 1, where the valve comprises a pressure responsive valve adapted to control the flow of hydrating fluid into the mixing chamber automatically in response to a pressure difference between the hydrating fluid flow upstream and downstream of the valve.

5. The system of claim 3, where the valve comprises:
    a valve closure moveable to adjust the flow through the valve;
    a diaphragm coupled to move the valve closure;
    a regulator coupled to the flow upstream of the valve closure, the flow downstream of the valve closure and to a control volume adjacent the diaphragm, the regulator configured to feed pressure to the control volume that extends the diaphragm to move the valve closure toward closed when the pressure upstream of the valve closure exceeds the specified pressure.

6. The system of claim 5, further comprising a control fluid enclosed within the control volume, the control fluid comprising a different fluid than the hydrating fluid.

7. The system of claim 1, where the valve comprises:
    a valve closure moveable to adjust the flow through the valve;
    a sensor downstream of the valve closure; and
    a controller coupled to the sensor and configured to move the valve closure in response to an output of the sensor.

8. The system of claim 1, where each of the multiple different values of the flow condition comprises a unique inlet pressure at the hydrating fluid inlet that is produced by operation of the hydrating fluid source pump.

9. The system of claim 1, where the valve comprises a butterfly type closure.

10. A device for mixing dry fracturing gel with hydrating fluid, comprising:
    a mixer defining an interior mixing chamber;
    a dry gel inlet in fluid communication with the interior mixing chamber, the dry gel inlet directly connected to a tank containing dry, non-hydrated, particulate material, such that, when particulate material is dispensed from the tank, the dispensed particulate material is provided to the dry gel inlet in a non-hydrated state and introduced to the mixing chamber;
    a hydrating fluid inlet in fluid communication with the interior mixing chamber;
    a hydrating fluid source pump fluidly coupled to the hydrating fluid inlet and configured to circulate a hydrating fluid through the interior mixing chamber-at multiple different operating pressures;
    an automatic pressure reducing valve coupled to the hydrating fluid inlet and coupled to a controller that senses a flow condition of the valve and is configured to automatically adjust a flow area through the valve in response to a change in the operation of the pump so that, as the hydrating fluid source pump operates at the multiple different operating pressures, the valve maintains a constant specified pressure of the hydrating fluid supplied into the interior mixing chamber; and
    a mixed gel outlet oriented outward from the mixing chamber, and leading to a fluid conduit extending to a hydration tank.

11. The device of claim 10, where the valve comprises a butterfly type valve closure.

* * * * *